US 6,658,549 B2

(12) United States Patent
Wilson et al.

(10) Patent No.: US 6,658,549 B2
(45) Date of Patent: Dec. 2, 2003

(54) METHOD AND SYSTEM ALLOWING A SINGLE ENTITY TO MANAGE MEMORY COMPRISING COMPRESSED AND UNCOMPRESSED DATA

(75) Inventors: Kenneth Mark Wilson, San Jose, CA (US); Robert Bruce Aglietti, San Jose, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/863,988

(22) Filed: May 22, 2001

(65) Prior Publication Data

US 2002/0178333 A1 Nov. 28, 2002

(51) Int. Cl.[7] ............................................... G06F 12/02
(52) U.S. Cl. .................... 711/202; 710/68; 711/147; 711/154; 711/170; 711/205; 711/206
(58) Field of Search ...................... 710/68; 711/137, 711/113, 167, 170, 202, 203, 204, 205, 206, 207, 154

(56) References Cited

U.S. PATENT DOCUMENTS

| | | | | |
|---|---|---|---|---|
| 5,537,658 A | * | 7/1996 | Bakke et al. ............... 707/200 |
| 5,555,395 A | * | 9/1996 | Parks ......................... 711/145 |
| 5,696,927 A | * | 12/1997 | MacDonald et al. .......... 710/68 |
| 5,812,817 A | | 9/1998 | Hovis et al. ................. 711/173 |

OTHER PUBLICATIONS

IBM "MXT" Memory Compression Technology Debuts in a Server Works Northbridge (ServerSet III and MXT Technology), R. Brett Tremaine (Sujith Arramreddy, David Har, Kwok–Ken Mak, R. Brett Tremaine, Michael Wazlowski (unknown date).
Performance of Hardware Compressed Main Memory; Bulent Abali, Hubertus Franke, Xiaowei Shen, Dan E. Poff and T. Basil Smith (unknown date).
Operating System Support for Fast Hardware Compression of Main Memory Contents; Bulent Abali, Hubertus Franke; Jun. 11, 2000.

* cited by examiner

Primary Examiner—Than Nguyen

(57) ABSTRACT

A method for adding compressed page tables to an operating system is disclosed. An embodiment provides for a method in which a single entity, for example, an operating system has control of the compression and decompression of data and where the data is stored. When a data access is desired, the method accesses a table specifying the physical memory location of uncompressed data to determine if specified data is in uncompressed memory. The method of this embodiment accesses a table specifying the physical memory location of data in compressed memory to determine if the data is in the compressed memory. The method also access a page directory table to determine the location of the data in virtual memory in the event of a page fault. Then, this embodiment accesses the data based on the table look-up results.

15 Claims, 5 Drawing Sheets

METHOD AND SYSTEM ALLOWING A SINGLE ENTITY TO MANAGE MEMORY COMPRISING COMPRESSED AND UNCOMPRESSED DATA

TECHNICAL FIELD

The present invention relates to the field of computer memory management. Specifically, the present invention relates to a method and system for an operating system to manage compressed memory.

BACKGROUND ART

As the gap between hard drive access time and memory access time increases, it is increasingly desirable to locate more data in memory. This is increasingly important because the size of applications and data sets are increasing at a faster rate than the density of main memory. Furthermore, systems with multiprocessors may have many programs running simultaneously with each program having a relatively small number of pages of instructions and data in main memory. Hence, page faults may occur frequently. One way to increase the effective storage capacity of main memory is to compress the contents of main memory. However, conventional computer systems may be unable to efficiently manage the compressed data in main memory.

One conventional method that provides for compressed data in main memory is to indicate to the operating system at boot-up time that there is more physical memory than actually exists. The assumption is that compression will allow for the physical memory to act larger than it actually is. However, it is possible that physical memory can run out, if the assumption regarding compression fails. This system makes the operating system aware that memory is running out by, for example, adjusting a low memory indicator. A set of registers exist in the memory controller to control and monitor the compression status of the system. If the registers report that physical memory is becoming too full, an interrupt can be generated to warn the operating system of the impending out-of-memory condition. When the physical memory utilization gets too high, the low memory indicator is adjusted.

Unfortunately, in this conventional system, at times physical memory utilization may rapidly increase. Because of the limited speed of the swap disk, the system may need to temporarily stall applications from executing. This provides the system with the time it needs to free physical memory by swapping memory pages out to a hard drive, however, with the expense of stalling the execution of applications.

While such methods may allow for increased memory capacity, certain inefficiencies may result. For example, the operating system and the system controlling memory access and data compression may not have information known to the other system. Hence, there may not be an entity which is capable of intelligently planning in which memory to store a given piece of data. For example, if data being accessed has been compressed, the data must be decompressed before the data is read. Unfortunately, the operating system in most conventional systems does not know whether the data has been compressed. Therefore, the extra latency associated with the decompression is unexpected by the operating system.

Accordingly, the present invention provides a method and system for allowing an operating system to control the movement and compression/decompression of data in main memory. The present invention provides a single entity with knowledge of the latency to access specific data, wherein intelligent data storage decisions may be made. The present invention minimizes the need to access data on a slow access storage medium, such as a hard drive. These and other advantages of the present invention will become apparent within discussions of the present invention herein.

DISCLOSURE OF THE INVENTION

A method for adding compressed page tables to an operating system is disclosed. An embodiment provides for a method in which an operating system has control of the compression and decompression of data and where the data is stored. When a data access is desired, the operating system accesses a table specifying the physical memory location of uncompressed data to determine if specified data is in uncompressed memory. If the data is not in the uncompressed memory, the method of this embodiment accesses a table specifying the physical memory location of data in compressed memory to determine if the data is in the compressed memory. Then, this embodiment decompresses the data, if necessary, and returns the data.

In other embodiments further steps are performed, including accessing a translation look-aside buffer before accessing the uncompressed page table, and accessing a page directory table to locate data on a hard drive in the event of a page fault. Furthermore, the table look-ups may be performed in parallel, or in other orders.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
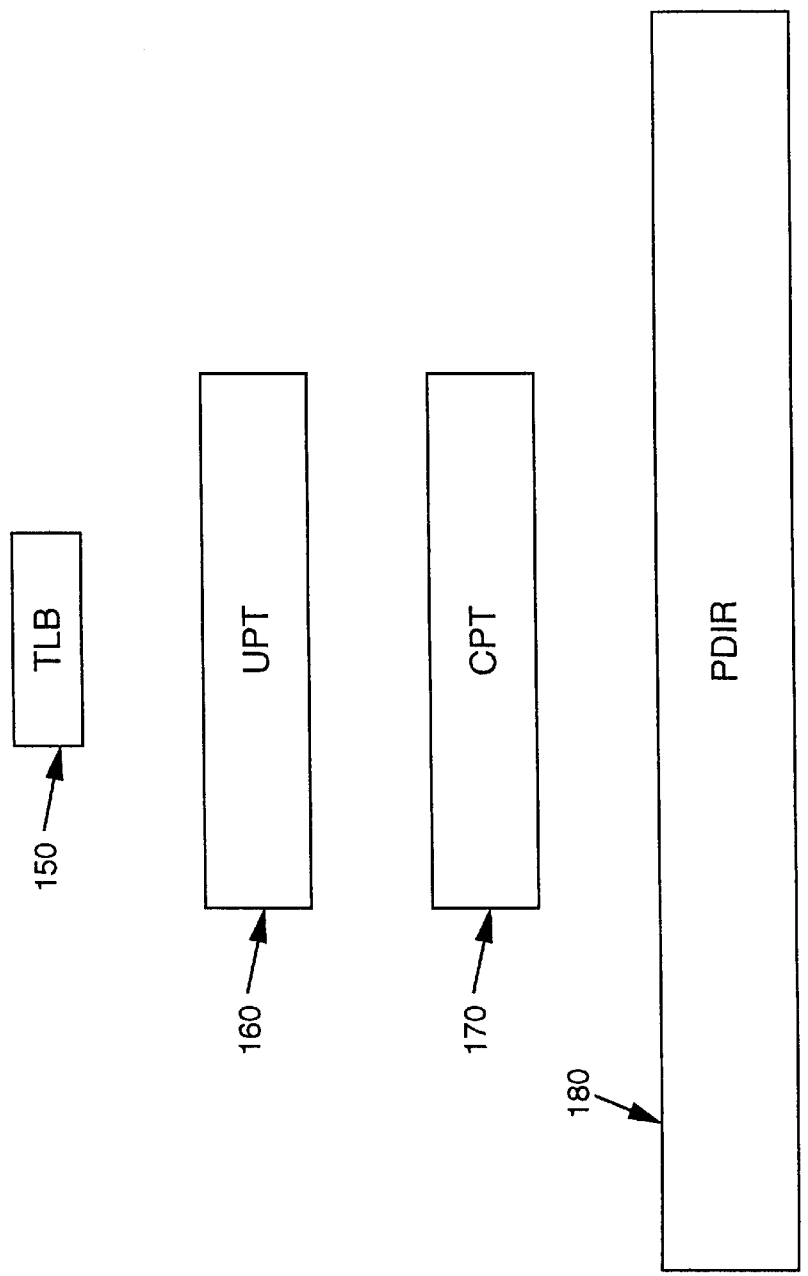
FIG. 1 is a diagram illustrating the logical hierarchy of directory tables within an operating system, according to an embodiment of the present invention.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Adding Compressed Page Tables To An Operating System

The present invention provides for a method and system for adding compressed page tables to an operating system. This allows a single entity, for example, an operating system, to control compression and decompression of data in main memory, as well as the flow and storage of the data. Thus, embodiments of the present invention tie together all pieces of virtual memory, including compressed data (e.g., pages, segments, etc.) into the operating system.

Referring now to FIG. 1, an embodiment of the present invention has a hierarchy of a page tables to determine the physical location of data. While embodiments of the present invention may refer to page tables and pages of data, it will be understood that the present invention is well suited to data stored in segments or otherwise. The hierarchy of tables includes a compressed page table 170 (CPT) between the uncompressed page table 160 (UPT) and the page directory 180 (PDIR). The UPT 160 holds the locations of all uncompressed pages currently in physical memory. The CPT 170 holds the locations of all compressed pages currently in physical memory. The PDIR 180 holds the physical locations of all virtual memory pages. Additionally, the hierarchy contains a translation look-aside buffer 150 (TLB), which may be implemented in hardware. Thus, the present embodiment adds a compressed page table 170 to a hierarchy that may be used in conventional systems.

The size of the compressed page table 170 may be the same order of magnitude as an uncompressed page table 160 for a main memory of the same size in a system without a compressed page table 170. However, the present embodiment may allow for a smaller uncompressed page table 160 than conventional systems with the same size of main memory because fewer pages are held in uncompressed memory.

Figure 4:
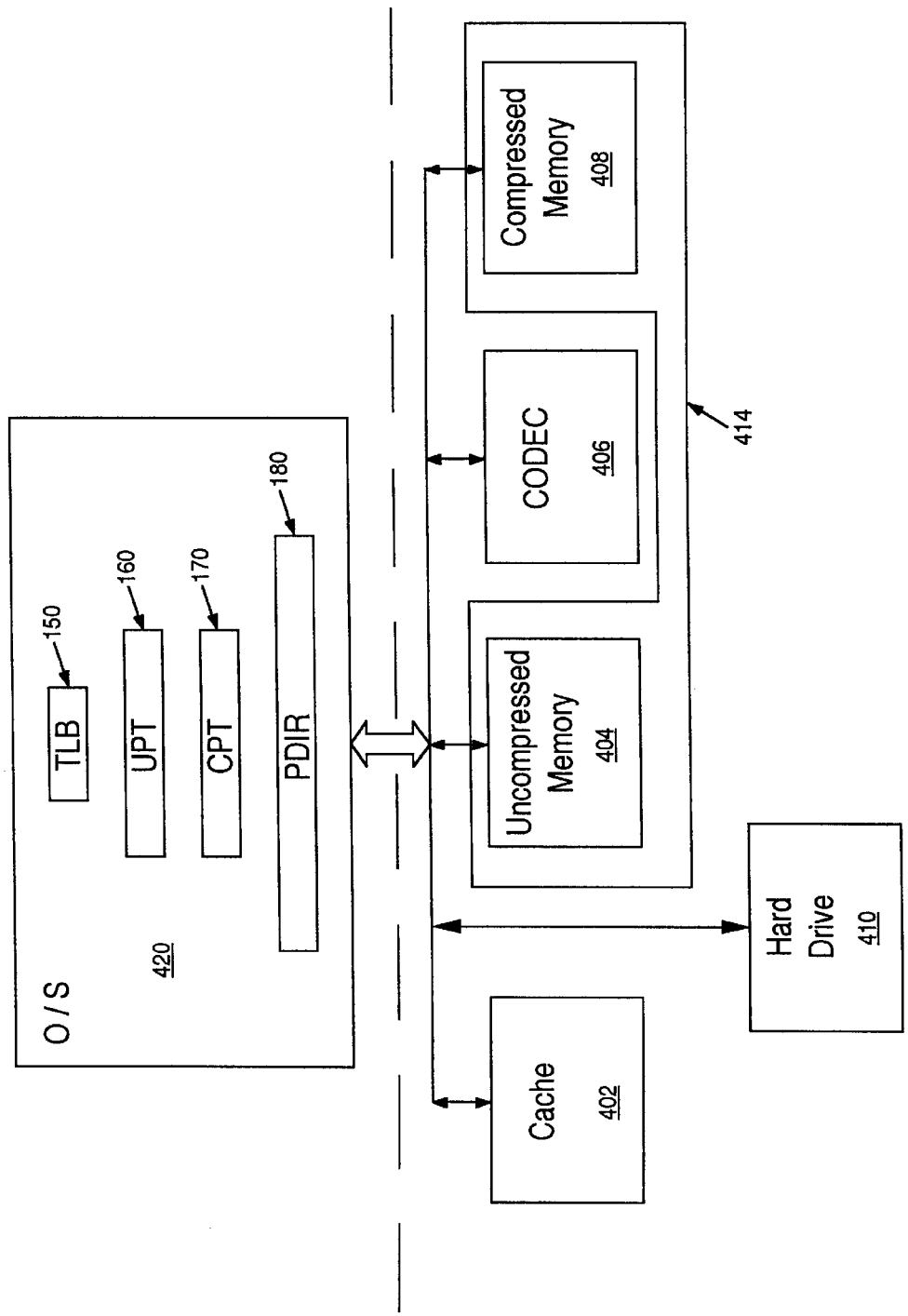
FIG. 4 is a diagram of an exemplary system in which embodiments of the present invention may operate.

FIG. 4 illustrates an exemplary system in which embodiments may operate. The operating system 420 is represented above the dashed line to separate the operating system 420 conceptually from the hardware which the operating system 420 controls below the dashed line. The operating system 420 contains the hierarchy of tables discussed herein in connection with FIG. 1. The hardware comprises a cache 402, compressed memory 408, uncompressed memory 404, a compression/decompression engine 406 (CODEC), and storage medium 410 (e.g., hard drive, tape, diskette, etc.). It will be understood that the distinction between compressed 408 and uncompressed memory 404 may be a logical one and that both may exist in the same physical storage, for example, the same memory array. Throughout this application the term uncompressed memory 404 may be defined as memory containing uncompressed data. In a similar fashion, compressed memory 408 may be defined as memory containing compressed data. The data in virtual memory may reside on the storage medium 410 or in the main memory 414.

Figure 2:
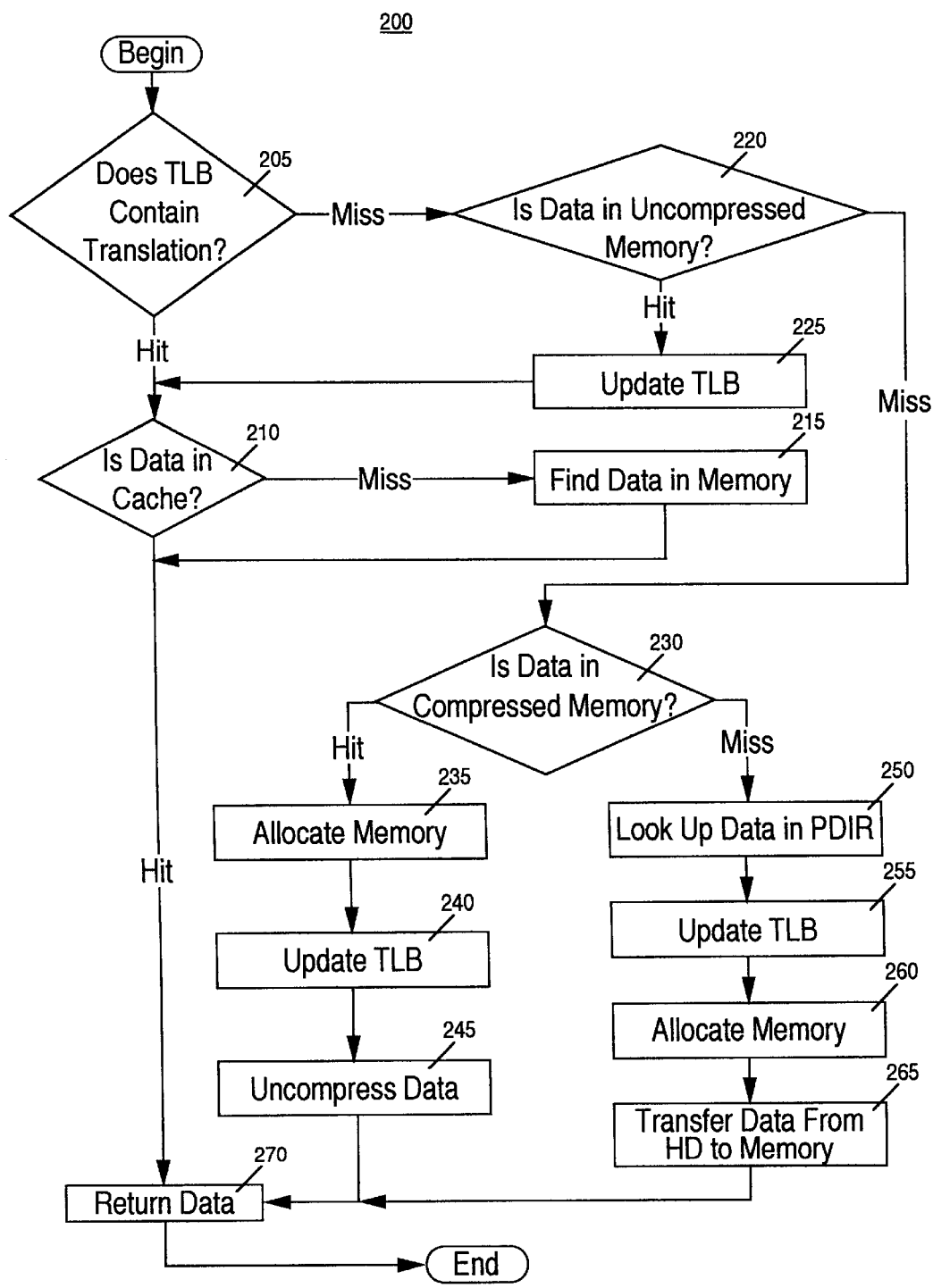
FIG. 2 is a flowchart illustrating the steps of a process of memory management using a compressed page table, according to an embodiment of the present invention.

FIG. 2 illustrates the steps of a process 200 for adding compressed page tables 160 to an operating system 420. In step 205, the process 200 determines whether the translation look-aside buffer 150 contains the virtual to physical translation for the virtual address that is to be accessed. The TLB access is a hardware cache look-up. Steps of process 200 may be performed in parallel, as those of ordinary skill in the art will understand. For example, the TLB access is usually performed in parallel with a cache access described in later steps.

If the translation is in the TLB 150, then the process 200 determines if the data is in the data cache 402, in step 210. If so, the data is returned in step 270 and the process 200 ends. If the data is not in the cache 402, then the process 200 finds the data in main memory 414, in step 215. In this case, the translation from a virtual address to a physical address will exist in the TLB 150.

If step 205 determined that the TLB 150 did not have the translation, then step 220 is taken in which the process 200 determines if the page is in uncompressed memory 404 by accessing the uncompressed page table 160.

If the data is determined to be in uncompressed memory 404, then the process updates the TLB 150, in step 225. For example, the virtual to physical translation is put into the TLB 150. Then, the process 200 returns to step 210 to access either the cache 402 or the main memory 414 so that the uncompressed data may be returned, in step 270.

If the access to the uncompressed page table 160 revealed that the data is not in uncompressed memory 404, then step 230 is executed. In this step, the compressed page table 170 is accessed to determine if the data is in compressed memory 408.

If the data is in compressed memory 408, then, in step 235 the process 200 allocates memory in uncompressed storage 404 for the compressed data after it is decompressed.

Next, in step 240, the process 200 updates the TLB 150 so that it contains the virtual to physical translation of the address in which the data will be stored after decompression.

Next, in step 245, the process 200 decompresses the data. The decompression may be executed in hardware or software. Then, the memory access completes and the data is returned and the process 200 ends. By compressing data, the effective size of main memory 414 is increased and the number of page faults decreases. Furthermore, the latency when accessing data from compressed memory 408 is extremely small compared to the latency when a page fault occurs. Therefore, accessing compressed data may result in a considerable improvement in latency.

If the access to the compressed page table 170 determined that the data was not in compressed memory 408, then a page fault has occurred and step 250 is executed. In step 250, the page directory (PDIR) 180 is accessed to determine the location of the data on the storage medium 410 (e.g., hard drive, etc.).

Next, memory is allocated for the data, in step 255. Then, in step 260, the TLB 150 is updated to contain the virtual to physical translation for the location where the data will be stored.

Then in step 265, the process 200 transfers the data from the storage medium 410 to main memory 414. It will be understood that this step may occur in the background. The latency of accessing data when a page fault occurs may be slightly higher than conventional systems because of the access to the compressed page table 170. However, this increase is extremely small in comparison to the latency of accessing a hard drive, and thus is insignificant.

It will be understood that the steps of process 200 of FIG. 2 may be performed in other orders. For example, the access to the UPT 160, CPT 170, and PDIR 180 may occur in any order or simultaneously, in other embodiments.

Figure 3:
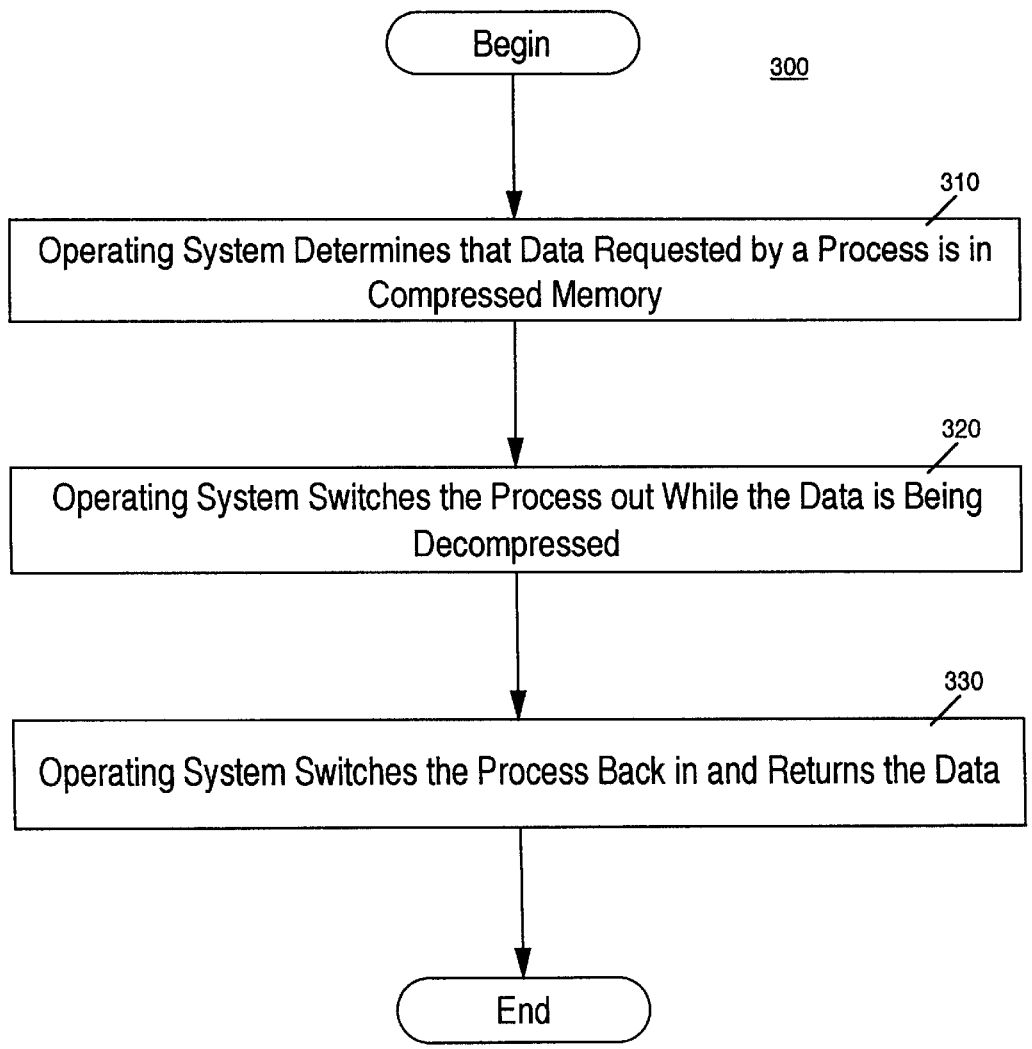
FIG. 3 is a flowchart illustrating the steps of a process of an operating system swapping out a process which is accessing compressed data, according to an embodiment of the present invention.

The flowchart of FIG. 3, shows the steps of a process 300 of an embodiment in which the operating system 420 optimizes the system resources by switching out a program which requests access to data that needs to be decompressed. In step 310, the operating system 420 determines that the data requested by a process is in compressed memory 408.

Then in step 320, the operating system 420 switches the process out while the data is decompressed. In this fashion, system resources are not wasted, as would happen if the operating system 420 was not aware that decompression was being performed.

Finally, in step 330, the operating system 420 switches the process back in and returns the data.

In addition to the advantages involving decompression, placing control inside of the operating system 420 of the compression/decompression of pages has advantages for the compression of pages. Because the operating system 420 knows that pages may be stored in compressed memory 408, uncompressed memory 404, or the storage medium 410, the operating system 420 may determine the optimum storage location, based on the latency of each storage mechanism. For example, the operating system 420 may transfer pages between compressed memory 408 and uncompressed memory 404, based on the latencies and expected likelihood of access. Furthermore, compression of pages may be performed in the background.

Figure 5:
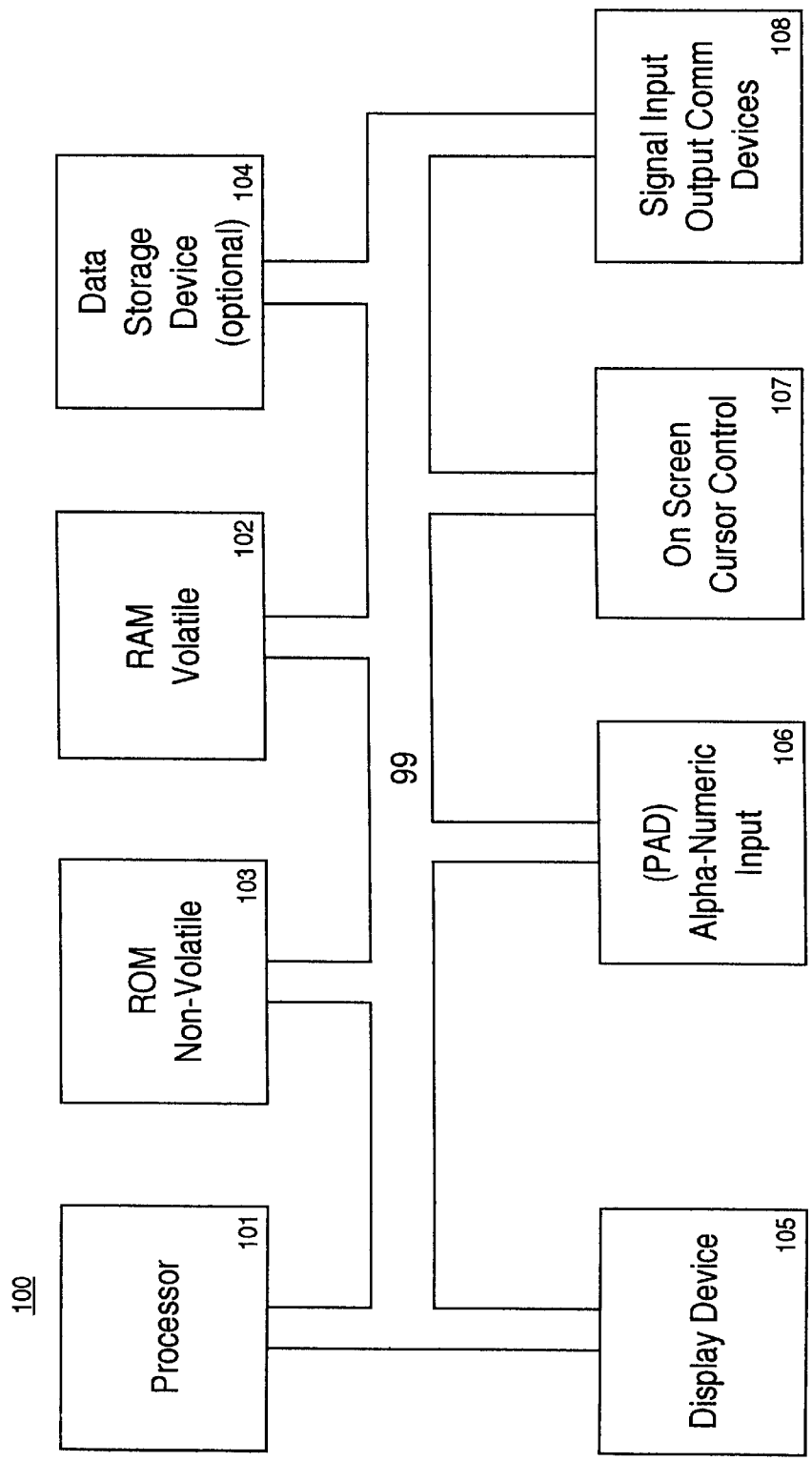
FIG. 5 is a schematic of a computer system, which may be used to implement embodiments of the present invention.

FIG. 5 illustrates circuitry of computer system 100, which may form a platform for embodiments of the present invention. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 5, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A signal input/output communication device 108 coupled to bus 99 provides communication with external devices.

The preferred embodiment of the present invention, a method and system for adding compressed page tables to an operating system, is thus described. While the present invention has been described in particular embodiments, it should be appreciated that the present invention should not be construed as limited by such embodiments, but rather construed according to the below claims.

What is claimed is:

1. A method allowing a single entity to manage memory comprising compressed and uncompressed data, said method comprising the steps of:
    a) accessing a first table, which specifies the physical memory location of uncompressed data, to determine if specified data is in uncompressed memory;
    b) accessing a second table, which specifies the physical memory location of data in compressed memory, to determine if said specified data is in said compressed memory, said entity having control of compression and decompression of data and where said data is stored; and
    c) determining where to store data, based on latency of accessing said data to be stored.

2. The method as described in claim 1 further comprising the steps of:
    d) accessing a third table, which specifies the physical location of data in virtual memory, to determine the physical location of said specified data; and
    e) if said data resides on a storage medium, transferring said specified data to main memory.

3. A method as described in claim 1 wherein said entity is an operating system.

4. A method as described in claim 1 further comprising the step of:
    d) decompressing said specified data if said specified data is compressed.

5. The method of claim 1, wherein said c) further comprises determining where to store said data to be stored, based on expected likelihood of accessing said data to be stored.

6. A computer readable medium having stored thereon program instructions for implementing a method allowing a single entity to manage memory comprising compressed data and uncompressed data, said method comprising:
    a) accessing by said single entity a first table, which specifies the physical memory location of uncompressed data, to determine if specified data is in uncompressed memory;
    b) accessing by said single entity a second table, which specifies the physical memory location of data in compressed memory, to determine if said specified data is in said compressed memory, said single entity having control of compression and decompression of data and where said data is stored; and
    c) said single entity optimizing storage location of stored data by:

c1) accessing said stored data from said uncompressed memory;

c2) compressing said stored data after said accessing; and c3) re-storing said stored data in said compressed memory.

7. The computer readable medium of claim 6, wherein said c2) of said method takes place in the background.

8. The computer readable medium of claim 6, wherein said single entity is an operating system.

9. The computer readable medium of claim 6, wherein said method further comprises:

d) said single entity decompressing said specified data if said specified data is compressed.

10. A method allowing a single entity to manage memory comprising compressed and uncompressed data, said method comprising the steps of:

a) said single entity receiving a request for data;

b) said single entity determining if said requested data is in said memory comprising compressed and uncompressed data by:

b1) accessing a first table, which specifies the physical memory location of uncompressed data, to determine if said requested data is uncompressed in said memory; and b2) if said requested data is not uncompressed in said memory accessing a second table, which specifies the physical memory location of compressed data in said memory, to determine if said requested data is compressed in said memory, said single entity having control of compression and decompression of data and where data is stored;

c) if said requested data is determined to be compressed in said memory, said single entity removing from said memory a process which requested said requested data; and d) said single entity decompressing said requested data while said process is removed from said memory.

11. A method as described in claim 10 wherein said single entity is an operating system.

12. The method of claim 10 wherein said decompression is software implemented.

13. The method of claim 10 wherein said decompression is hardware implemented.

14. The method of claim 10 wherein said method further comprises:

e) said single entity decompressing stored data that is compressed in said memory and re-storing said stored data decompressed in said memory, based on expected latencies of access time of compressed data and uncompressed data in said memory and likelihood of access of said stored data.

15. The method of claim 10 wherein said method further comprises:

e) said single entity compressing stored data that is decompressed in said memory and restoring said stored data decompressed in said memory, based on expected latencies of access time of compressed data and uncompressed data in said memory and likelihood of access of said stored data.

* * * * *